United States Patent [19]
Turolla

[11] 3,752,174
[45] Aug. 14, 1973

[54] RELIEF VALVES

[76] Inventor: Marco Turolla, 213 Via Toscana, Bologna, Italy

[22] Filed: June 8, 1971

[21] Appl. No.: 150,968

[30] Foreign Application Priority Data
June 16, 1970 Italy............................. 12750 A/70

[52] U.S. Cl............................... 137/491, 137/244
[51] Int. Cl............................................. F16k 31/36
[58] Field of Search.................... 137/491, 244, 245, 137/596.12, 217

[56] References Cited
UNITED STATES PATENTS

| | | | |
|---|---|---|---|
| 2,827,075 | 3/1958 | Mercier | 137/491 |
| 2,039,109 | 4/1936 | Pasman | 137/217 |
| 2,988,106 | 6/1961 | Rue | 137/596.12 |
| 3,578,019 | 5/1971 | Turolla | 137/491 |

FOREIGN PATENTS OR APPLICATIONS

| | | | |
|---|---|---|---|
| 1,817,143 | 7/1969 | Germany | 137/491 |
| 715,200 | 9/1954 | Great Britain | 137/491 |

*Primary Examiner*—Henry T. Klinksiek
*Attorney*—Berman, Davidson & Berman

[57] ABSTRACT

A safety valve device of the kind provided with a throttle bore has the bore kept clean and free from impurities entrained in a fluid pressure medium passing through the device by a wire which is at least partly housed with clearance in the throttle bore and which is so supported that relative longitudinal and transverse movement between the wire and the bore is directly or indirectly effected by the action of pressure medium passing through the device.

7 Claims, 5 Drawing Figures

Patented Aug. 14, 1973

INVENTOR
MARCO TUROLLA,

BY Berman, Davidson & Berman,
ATTORNEYS

Patented Aug. 14, 1973

INVENTOR
MARCO TUROLLA,

BY Berman, Davidson & Berman,
ATTORNEYS

RELIEF VALVES

BACKGROUND OF THE INVENTION

1. Field of the Invention

This invention relates to a safety valve device particularly for an hydraulic or a pneumatic system, comprising a valve casing including in axial spaced relation a control cylinder and a shock absorber cylinder, a control piston slidable axially in the control cylinder and connected by a stepped connecting stem with a shock absorber piston slidable axially in the shock absorber cylinder, said control piston including a valve closure element co-operable with a valve seating formed in the valve casing between the control and shock absorber cylinders and being spring-urged into engagement with the valve seating, an annular pressure chamber formed between the valve casing and said connecting stem, a radial aperture in the valve casing to connect the annular pressure chamber with a source of pressure medium, a throttle passage effecting communication between the shock absorber cylinder and the annular pressure chamber, a throttle bore formed at least in said connecting stem and communicating with the annular pressure chamber and co-axially with the control cylinder, at least one radial pressure medium discharge opening in the valve casing connectable with a pressure medium discharge pipe, and a spring-loaded control valve co-axial with said valve closure element and operable to control the passage of pressure medium from the control cylinder to said pressure medium discharge opening.

2. Description of the Prior Art

In known safety valve devices of the above kind the throttle bore between the annular pressure chamber and the control cylinder is often completely or partly clogged by fine impurities entrained by the pressure medium flowing through the devices. The operation of the safety valve device, which is dependent on this throttle bore, is thereby disturbed. It is consequently necessary for the throttle bore to be kept continuously open by continuous removal of the impurities deposited or trapped therein, that is to say its accurately predetermined clear throughflow cross-section must be kept unchanged.

SUMMARY

It is a main object of the invention to provide a safety valve device of the kind first described above which fulfils the above requirement, that is to say at low additional cost ensures an effective, automatic cleaning of the throttle bore to remove impurities deposited or trapped therein, and which consequently prevents the clogging of the throttle bore or the detrimental, undesired reduction of its pristine clean throughflow cross-section.

According to the invention this problem is solved by providing a cleaning wire at least partly located in said throttle bore and so supported as to permit relative movement between the wire and the throttle bore longitudinally and/or transversely of the bore directly or indirectly by the action of pressure medium in the valve casing. The movement of the cleaning wire may be brought about both directly through the flow (turbulence, pressure fluctuations, or the like) of the pressure medium flowing through the device and indirectly by relative movements, produced by the pressure medium, of individual parts of the safety valve device in relation to one another. Through the movement of the cleaning wire in the throttle bore the impurities trapped or deposited therein are crushed or ground up and detached from the walls of the throttle bore, so that the impurities are entrained and carried off by the pressure medium flowing through the device and the predetermined clear throughflow cross-section of the throttle bore is retained. The cross-section or the diameter of the cleaning wire on the other hand must naturally be adjusted in relation to one another in such a manner that the annular gap left around the cleaning wire has the predetermined clear throughflow cross-section required for the throttling.

DESCRIPTION OF THE PREFERRED EMBODIMENTS

Figure 1:
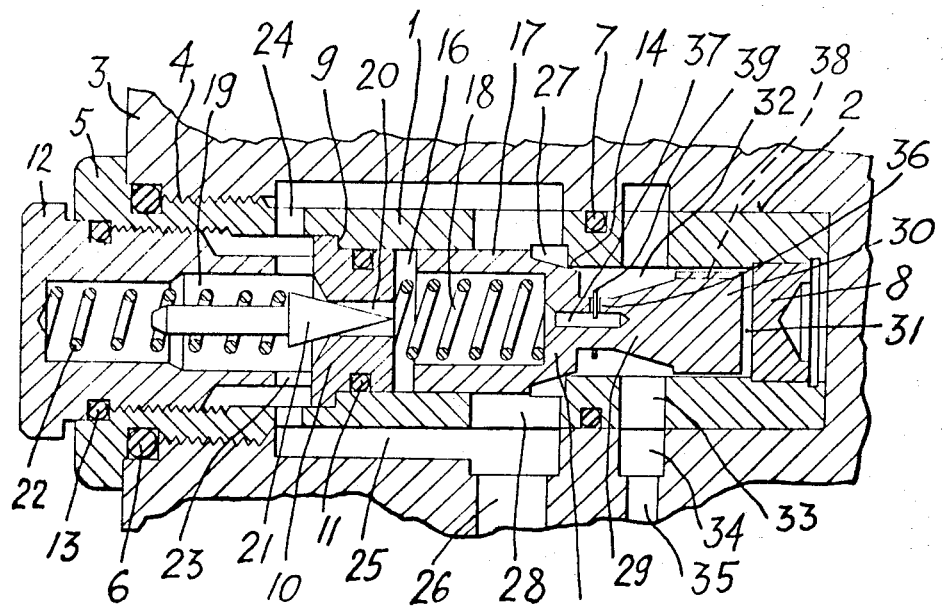
FIG. 1 is a longitudinal section of a safety valve device according to the invention.

Referring to FIG. 1, the safety valve device has a cylindrical casing 1 inserted as a unit into a corresponding bore 2 in a receiving element 3. The outer end 4 of the casing is screwed into the element 3 until a flange 5 on the casing abuts the element 3. Sealing between the valve casing 1 and the receiving element 3 is ensured by an accurate fit therebetween or by sealing rings 6, 7. The receiving element 3 for the valve casing 1 may be any machine part, particularly a component of a hydraulic or pneumatic system.

The bore of the valve casing 1 is cylindrical, has a plurality of steps, and has its inner end tightly closed by a plug 8. A shoulder 9 provided in the casing bore 2, approximately in the middle part of the casing 1, serves as abutment for a stepped separating disc 10. Sealing between the separating disc 10 and the casing 1 is ensured by a sealing ring 11. That end of the casing bore 2 which is at the outer end of the casing when the latter is installed in a machine part is tightly closed by a cup-shaped bush 12 which is screwed into the outer end of the casing 1 and presses and holds the separating disc 10 fast against the shoulder 9. A sealing ring 13 provides a seal between the bush 12 and the casing 1.

Another shoulder 14 is provided in the casing bore 2 between the plug 8 and the separating disc 10 forms a valve seat for the closure element 15 of a main valve. The portion of the casing bore 2 lying between the valve seat 14 and the separating disc 10 forms a control cylinder 16 for a cup-shaped control piston 17. The piston 17 is secured to, or is integral with, the main valve closure element 15 and is slidable axially in the cylinder 16. A compression spring 18 disposed in the control cylinder 16 presses the main valve closure element 15 against the valve seat 14, that is to say into the closed position.

The control cylinder 16 communicates with an outlet chamber 19, which is formed in the closure bush 12. A bore 20, co-axial with the chamber 19 is formed in the separating disc 10 and is provided with a control valve 21. The control valve 21 is a needle-type valve having a conical end and is mounted to be slidable axially in the outlet chamber 19. A compression spring 22 disposed in the chamber 19 urges the valve 21 into the closed position thereof, that is to say against the outlet end of the bore 20, this outlet end having the form of a valve seat. The outlet chamber 19 is arranged to communicate with an inner annular widened portion 25 in the receiving element 3 through a radial opening 23 in the bush 12 and a radial opening 24 in the casing 1. The annular widened portion 25 ommunicates with an outlet pipe 26 for discharged pressure medium. On the side of the main valve seat 14 facing the control piston 17 there is provided around the main valve closure element 15 an annular chamber 27, which by way of radial outlet apertures 28 in the casing 1 is also in communication with the annular widened portion 25 of the bore 2 and consequently with the outlet pipe 26.

On the opposite side to that facing the control piston 17 the main valve closure element 15 is connected by a necked stem 29 to a shock absorber piston 30, which is axially slidable in the end portion of the casing 1, this portion forming a shock absorber cylinder 31. The shock absorber piston 30 and the connecting stem 29 are preferably integral with the main valve closure element 15. A necked portion of the connecting stem 29 forms with the cylinder 31 an annular pressure chamber 32, which by way of radial inlet apertures 33 in the casing 1 is in communication with an inner annular groove 34 in the bore 2 of the receiving element 3. An admission pipe 35 for pressure medium to be discharged leads into the groove 34.

By way of an axial blind bore 37, which is provided in the main valve closure element 15 and in the connecting stem 29, and also by way of an adjoining radial throttle bore 36 provided in the connecting stem 29 the control cylinder 16 is in communication with the annular pressure chamber 32. In addition, the annular pressure chamber 32 is in communication through a throttle passage with the shock absorber cylinder 31. In the example illustrated the throttle passage consists of a continuous, axially extending, groove 38 in the peripheral surface of the shock absorber piston 30, but it may be in the form of an axially extending groove provided in the side wall of the shock absorber cylinder 31, or of an annular throughflow gap between the shock absorber piston 30 and the side wall of the shock absorber cylinder 31.

A pressure medium, for example hydraulic oil, flowing through the admission pipe 35 into the adjoining inner groove 34 in the bore 2 passes by way of the radial apertures 33 in the valve casing 1 into the annular pressure chamber 32 and fills the control cylinder 16 by way of the throttle bore 36 and the axial bore 37 on the one hand, and the shock absorber cylinder 31 by way of the throttle passage 38 on the other hand. When in the closed position the control valve closure element 21 bears against the corresponding valve seat, there is built up in the control cylinder 16 a pressure which corresponds to the pressure in the admission pipe 35 and in the pressure chamber 32. On the outer side of the main valve closure element 15, directed towards the control cylinder 16, a force consequently acts which is composed of the force of the spring 18 and the hydraulic or pneumatic pressure prevailing in the control cylinder 16. On the inner side of the main valve closure element 15, directed towards the shock absorber piston 30, on the other hand there acts a force which is produced by the hydraulic or pneumatic pressure, prevailing in the pressure chamber 32, of the pressure medium to be discharged. The main valve closure element 15 is thus pressed against the corresponding valve seat 14 by a closing force which results from the difference between these two oppositely directed forces. The partial force which acts in the closing direction on the outer side of the main valve closure element 15, and which is produced by the hydraulic or pneumatic pressure in the control cylinder 16, is greater than the force which acts on the inner side of the main valve closure element 15, in the opening direction, and which is produced by the hydraulic or pneumatic pressure of the medium to be discharged, since the cross-sectional area of the control cylinder 16 is larger than the inner surface of the main valve closure element 15 which is acted on by the pressure medium.

If the pressure of the pressure medium now exceeds the force of the closure spring 22 acting on the closure element 21 of the control valve, the closure element 21 is lifted off its valve seat into the open position and allows the pressure medium to escape from the control cylinder 16 through the separating disc bore 20 and the lateral radial apertures 23, 24 into the annular widened portion 25 of the insertion bore 2 and consequently into the outlet pipe 26. In consequence of the sudden reduction of pressure occurring in the control cylinder 16 and of the corresponding relieving of the control piston 17 from the hydraulic or pneumatic portion of the closing force, the closure element 15 of of the main valve is lifted off its valve seat 14 into the open position by the pressure of the medium to be discharged, acting on the inner side of the closure element 15. Consequently the pressure medium flows out of the pressure chamber 32 through the opened main valve by way of the radial apertures 28 and the annular widened portion 25 of the insertion bore 2 into the outlet pipe 26.

After the super-atmospheric pressure has been released the closure element 21 of the control valve is pressed by the spring 22 back into the closed position against the corresponding valve seat on the separating disc 10. In the control cylinder 16 there is then built up again, by way of the throttle bore 36 and the axial bore 37, a hydraulic or pneumatic pressure which, in conjunction with the spring 18, presses the closure element 15 of the main valve back into the closed position against the valve seat 14.

During the opening and closing of the main valve, together with the closure elements 15, the shock absorber piston 30 which is integral with the closure element 15 or connected to it by the connecting stem 29 is moved to-and-fro in the shock absorber cylinder 31. The pressure medium flows through the throttle passage 38 out of the pressure chamber 32 into the shock absorber cylinder 31 and back. In consequence of the narrow throughflow cross-section of the throttle passage 38, both the opening movement and the closing movement of the main valve closure element 15 are thereby braked in such a manner that undesired fluttering and detrimental shocks, particularly on the closing of the main valve, are avoided.

Figure 2:
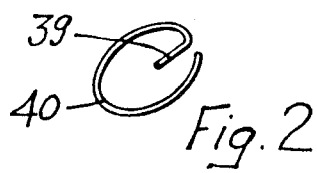
FIG. 2 shows in perspective a wire ring used in the device shown in FIG. 1.

For the most satisfactory operation of the safety valve device it is important that the throttle bore 36 inserted between the pressure chamber 32 and the control cylinder 16 should retain its accurately predetermined clear throughflow cross-section continuously and without change, and that it should not be entirely or partly clogged by the unavoidable fine impurities entrained by the pressure medium. For this purpose a considerably narrower cleaning wire 39 engages from outside in the throttle bore 36 and extends over the entire length of bore 37, that is to say it projects into the axial bore 37, and is formed by the inwardly bent-over end of an open wire ring 40. The wire ring 40, shown in FIG. 2, is disposed in the annular pressure chamber 32 and surrounds, with radial and/or axial movement clearance, the necked connecting stem 29 between the main valve closure element 15 and the shock absorber piston 30. The flow of the pressure medium in the annular pressure chamber 32 and through the throttle bore 36, and also the consequent turbulence phenomena or pressure fluctuations effect a reciprocating movement or vibration of the wire ring 40, and of the cleaning wire 39 joined thereto, in the longitudinal and/or transverse direction of the throttle bore 36. The impurities deposited or trapped in the throttle bore 36 are loosened and detached or crushed and ground up by this movement of the cleaning wire 39, so that they are entrained and flushed out by the pressure medium flowing through. The throttle bore 36 is consequently automatically kept completely free and open. The diameters of the throttle bore 36 on the one hand and of the cleaning wire 39 on the other hand are so selected and matched to one another that the open annular gap remaining around the cleaning wire 39 has the predetermined throughflow cross-section required for the throttling.

Figure 3:
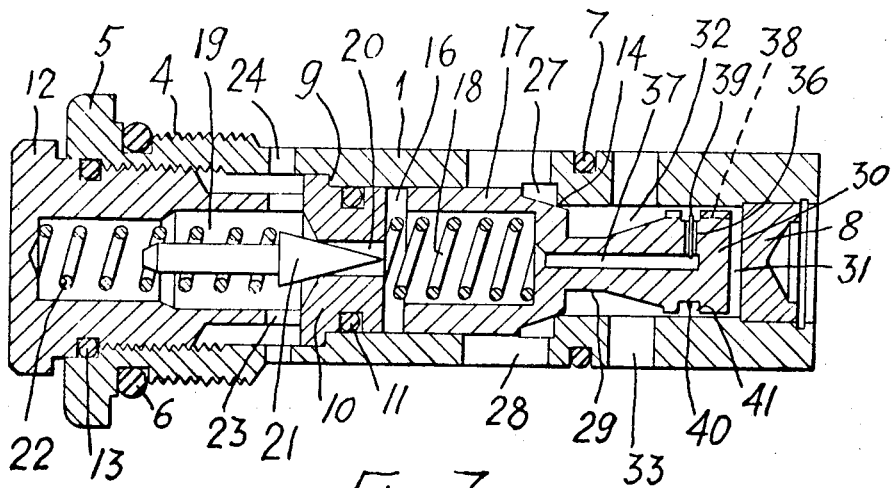
FIGS. 3 to 5 are longitudinal sections of three alternative forms of safety valve devices according to the invention.
Figure 4:
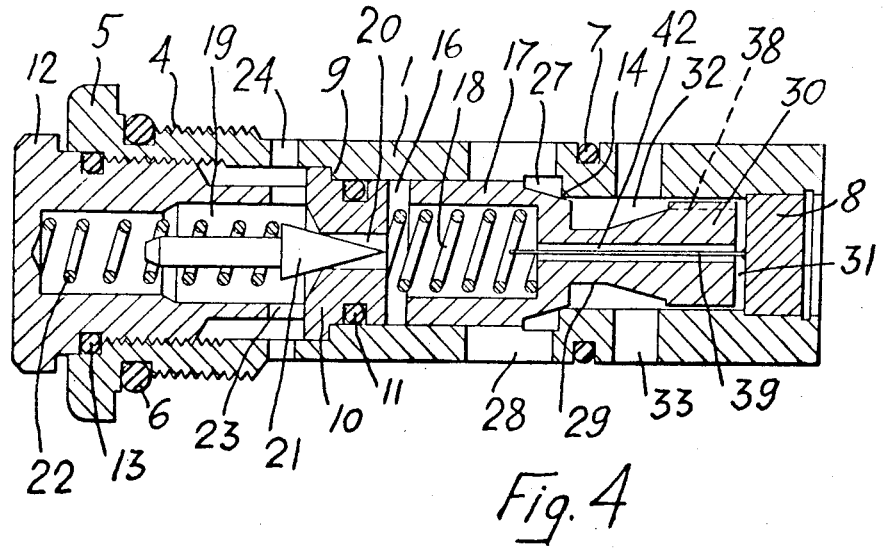
Figure 5:
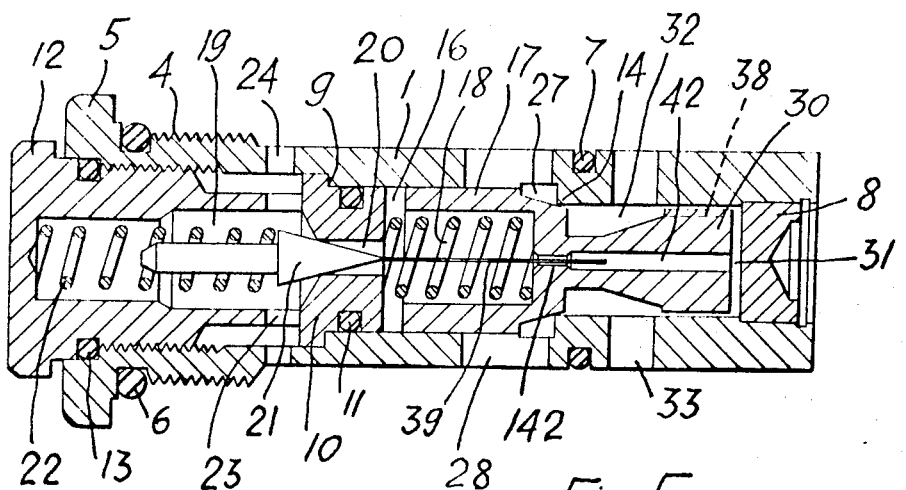

The modified examples of the safety valve device which are illustrated in FIGS. 3 to 5 correspond in basic construction and in their mode of operation with the embodiment already described with reference to FIG. 1, identical parts being given the same reference. The receiving element 3 with its recesses 2, 25, 34 and pipes 26, 35 is not illustrated in FIGS. 3 to 5.

In the example according to FIG. 3 the axial blind bore 37 extends through the connecting stem 29 between the main valve closure element 15 and the shock absorber piston 30 into the shock absorber piston 30. The radial throttle bore 36 connected thereto is provided in the shock absorber piston 30 and leads into an annular groove 41 provided in the peripheral surface of the piston 30. Consequently the radial throttle bore 36 is in communication with the longitudinally directed throttle passage 38 which is disposed between the pressure chamber 32 and the shock absorber cylinder 31 and intersects the annular groove 41 in the peripheral wall of the piston. The connection between the control cylinder 16 and the pressure chamber 32 is thus made by way of the throttle bore 36 and the adjoining portion of the throttle passage 38.

The wire ring 40 with the bent-over end which engages in the throttle bore 36, and which constitutes the cleaning wire 39, is disposed with radial and/or axial movement clearance around the shock absorber piston 30, in the groove 41 provided in its peripheral wall.

This arrangement has the advantage that the wire ring lies protected in a practically closed annular chamber. In addition, the movement of the cleaning wire 39 or wire ring 40 is brought about by the pressure medium not only directly in consequence of the flow of the medium through the peripheral groove 41 in the shock absorber piston 30 and the throttle bore 36, but additionally also indirectly through the displacement of the main valve closure element 15 and of the shock absorber piston 30 which is also brought about by the pressure medium. The displacement of the shock absorber piston 30 on the opening and closing of the main valve produces in fact wobbling movements of the wire ring in the groove 41 in the periphery of the piston and corresponding movements of the cleaning wire 39 in the throttle bore 36. It is also possible for the wire ring 40 to be allowed to project in places, for example at its opposite end to that where the cleaning wire 39 is provided, out of the peripheral groove 41 in the shock absorber piston 30 and to be brought into contact with the side wall of the shock absorber cylinder 31, so that during the reciprocating movement of the shock absorber piston 30 it is halted by friction and performs corresponding reciprocating movements in the peripheral groove 41.

In the examples according to FIGS. 4 and 5 the control cylinder 16 is connected by way of the shock absorber cylinder 31 and the throttle passage 38 to the annular pressure chamber 32. For this purpose there is provided in the main valve closure element 15 and in the shock absorber piston 31, as well as in the connecting stem 29 between these two parts, a continuous central longitudinal bore 42 which leads on the one hand into the control cylinder 16 and on the other hand into the shock absorber cylinder 31. This longitudinal bore 42 may be in the form of a continuous throttle bore (FIG. 4), or may have a throttled portion 142 (FIG. 5).

In the embodiment illustrated in FIG. 4 a straight cleaning wire 39 is passed through the longitudinal or throttle bore 42 and projects freely at one end into the control cylinder 16, its other end being fastened, for example by soldering or welding, to the stationary plug 8. The displacement of the closure element 15, together with the shock absorber piston 30 and the connecting stem 29, caused by the pressure medium on the opening and closing of the main valve effects a relative axial movement between the simultaneously moved throttle bore 42 and the stationary cleaning wire 39. The relative movement between the cleaning wire 39 and the throttle bore 42 is thus effected mainly in the longitudinal direction of the bore 42 and is produced by the pressure medium indirectly through the movement of the main valve closure element 15.

In the embodiment illustrated in FIG. 5 the straight cleaning wire 39 is fastened on the closure element 21 of the control valve and, when the closure element 21 is in the open position thereof, extends through the bore 20 in the separating disc 10. The wire 39 also extends through the control cylinder 16, into the continuous longitudinal bore 42 which is provided in the main valve closure element 15 and in the shock absorber piston 30 and is coaxial with the control valve closure element 21. In this arrangement the cleaning wire 39 passes through the throttle portion 142 of the longitudinal bore 42 and ends in the interior of the adjoining wider portion of said longitudinal bore. Here again however it is also possible for the entire longitudinal bore 42 to be in the form of a throttle bore. In this case the cleaning wire 39 preferably extends over the entire length of the longitudinal or throttle bore 42, that is to say approximately as far as its outlet mouth on the head side of the shock absorber piston 30, or into the shock absorber cylinder 31. Conversely, in the embodiment illustrated in FIG. 4 the longitudinal bore 42 may also have only a portion in the form of a throttle bore, in which case the cleaning wire fastened to the plug 8 of the shock absorber cylinder 31 need extend only through the throttle portion.

In the embodiment illustrated in FIG. 5 the relative movement between the cleaning wire 39 and the throttle bore 142 or 42 takes place mainly in the longitudinal direction of the bore 142 and is brought about by the pressure medium indirectly both through the movement of the main valve closure element 15 and through the movement of the control valve closure element 21. In this case additional advantages are achieved as compared with the arrangement according to FIGS. 1, 3 and 4. Firstly, the stroke of the longitudinally directed relative movement between the cleaning wire 39 and the throttle bore 142 or 42 is considerably increased, since the control valve closure element 21 has a substantially larger opening stroke than the main valve closure element 15. In addition, the frequency of the relative movements between the cleaning wire 39 and the throttle bore 142 or 42 is increased, since on each response of the safety valve device a longitudinal displacement of the cleaning wire 39 is first effected in relation to the throttle bore 142 or 42, which at first is stationary, on the opening of the control valve closure element, and then a further displacement of the throttle bore 142 or 42 takes place in relation to the stationary cleaning wire 39 on the opening of the main valve closure element 15. On the closing of the control valve and main valve closure elements 21 and 15, two successive relative movements are produced between the cleaning wire 39 and the throttle bore 142 or 42. A particularly good cleaning action is achieved through the fact that as the result of its fastening on the control valve closure elements 21 the cleaning wire 39 participates in the fluttering movements of the closure element 21 which occur on the opening and closing of the control valve, and consequently performs corresponding longitudinal oscillations in the throttle bore 142 or 42.

It should finally be mentioned that in the embodiments illustrated in FIGS. 4 and 5 the cleaning wire 39 can additionally perform movements or vibrations directed transversely to the throttle bore 42 or 142, which are produced directly by the flow of the pressure medium flowing through, particularly if the wire is made thin or elastic. Such transversely directed movements of the cleaning wire 39 in relation to the throttle bore 39 are in addition also produced by the opening or closing or fluttering movements of the control valve closure element 21, since the latter in performing these movements always slightly oscillates or reels, particularly when, as in the present case, it is not accurately guided longitudinally.

I claim:

1. In a safety valve device, particularly for an hydraulic or a pneumatic system, of the type including a valve casing having in axial spaced relation a control cylinder and a shock absorber cylinder closed by a plug, a control piston slidable axially in the control cylinder and connected by a stepped connecting stem with a shock absorber piston slidable axially in the shock absorber cylinder, said control piston including a valve closure element co-operable with a valve seating formed in the valve casing between the control and shock absorber cylinders and being spring-urged into engagement with the valve seating, an annular pressure chamber formed between the valve casing and said connecting stem, a radial aperture in the valve casing to connect the annular pressure chamber with a source of pressure medium, a throttle passage effecting communication between the shock absorber cylinder and the annular pressure chamber, a throttle bore formed in said connecting stem and communicating with the control cylinder, at least one radial pressure medium discharge opening in the valve casing connectable with a pressure medium discharge pipe, and a spring-loaded control valve coaxial with said valve closure element and operable to control the passage of pressure medium from the control cylinder to said pressure medium discharge opening, the improvements wherein said throttle bore extends axially through the valve closure element, the connecting stem, and the shock absorbing piston to effect communication between the control cylinder and the shock absorber cylinder, and a thin, elastic cleaning wire is fastened at one end to one of said spring-loaded control valve and said plug closing the shock absorber cylinder, said cleaning wire extending into said throttle bore and having a cross-section smaller than that of said throttle bore so as to leave an annular gap around the cleaning wire which is equal to a predetermined clear throughflow cross-section required for throttling, said gap permitting relative movement between the wire and the throttle bore longitudinally and transversely of the bore directly by movement of said valve control element and indirectly by the action of pressure medium in the valve casing.

2. A safety valve device according to claim 1, wherein said one end of the cleaning wire is fastened to said plug closing the outer end of the shock absorber cylinder.

3. A safety valve device according to claim 2, wherein the cleaning wire extends over the entire length of the throttle bore.

4. A safety valve device according to claim 2, wherein the portion of the throttle bore which passes through the valve closure member is of restricted cross-sectional area as compared with that of the remainder of the throttle bore.

5. The improvement in a safety device according to claim 1, wherein said cleaning wire is fastened to said spring-loaded control valve.

6. The improvement in a safety device according to claim 5, wherein the portion of the throttle bore which passes through the valve closure element is of restricted cross-sectional area as compared with that of the remainder of the throttle bore.

7. The improvement in a safety device according to claim 5, wherein said valve closure element is conical with its axis coaxial with the control chamber and said cleaning wire is fixed to the apex of the conical valve closure element and is also coaxial with the control chamber.

* * * * *